United States Patent [19]
Burnell et al.

[11] 3,820,323
[45] June 28, 1974

[54] COMPUTER TO MANUAL CHANGEOVER SYSTEM

[75] Inventors: Dennis G. A. Burnell, Winsted; George W. Jahrstorfer, South Windsor, both of Conn.

[73] Assignee: Chandler Evans Inc., West Hartford, Conn.

[22] Filed: Apr. 9, 1973

[21] Appl. No.: 349,206

[52] U.S. Cl. .......................................... 60/39.28 R
[51] Int. Cl. .............................................. F02c 9/08
[58] Field of Search ............................... 60/39.28 R

[56] References Cited
UNITED STATES PATENTS

| | | | |
|---|---|---|---|
| 2,880,580 | 4/1959 | Wallace | 60/39.28 R |
| 2,968,283 | 1/1961 | Hilker | 60/39.28 R |
| 2,980,069 | 4/1961 | Hilker | 60/39.28 R |
| 3,215,346 | 11/1965 | Alberani | 60/39.28 R |
| 3,695,037 | 10/1972 | Alberani | 60/39.28 R |

*Primary Examiner*—Clarence R. Gordon
*Attorney, Agent, or Firm*—Radford W. Luther; Richard A. Dornon

[57] ABSTRACT

A fuel control incorporating an electronic computer has a system which automatically transfers control of a metering valve from the computer to a manually operated lever member in the event of a computer failure. The system inlcudes a piston member having a cam surface thereupon which is rotatable and movable in a longitudinal direction. The piston member is connected to the metering valve such that the rotation of the piston member produces a positioning of the metering valve. The lever member, which has a cam follower thereupon, is adapted to coact with the cam surface on the piston member such that engagement between the cam surface and the follower produces a rotation of the piston member and hence a positioning of the metering valve. Upon failure of the electronic computer, power supply or an operator's use of a toggle switch, a manual control selector generates a selection signal to a piston member positioning structure which occasions a longitudinal movement of the piston member towards the lever member. The movement of the piston member toward the lever member causes the fuel flow to increase as a function of time, decrease as a function of time, or remain the same, depending upon the initial relationship between the lever member and the piston member.

6 Claims, 5 Drawing Figures

3,820,323

COMPUTER TO MANUAL CHANGEOVER SYSTEM

BACKGROUND OF THE INVENTION

This invention relates to fuel controls for gas turbine engines, and more particularly to electromechanical fuel controls.

Electromechanical fuel controls, which have evolved over the years, have found widespread utilization. Such controls invariably include a manual system to meter fuel in the event of a failure in the electronic computer in the control, such as a power failure would beget.

Obviously, it would be highly desirable to provide for automatic changeover to manual control in the event of an electronic computer malfunction. For example, should the fuel control be employed on an aircraft, an electronic computer failure during landing could have disasterous consequences.

SUMMARY OF THE INVENTION

The invention provides a means to automatically transfer control from the electronic computer of the fuel control to a manually operable lever member such that fuel flow is varied as a function of time until a resulting fuel flow is attained which corresponds to lever member position. Thereafter, fuel flow is manually changed by positioning the lever member.

A fuel control of the invention incorporates a metering valve for controlling fuel flow to the engine in accordance with the signals generated by an electronic computer which positions the metering valve. A piston member adapted for longitudinal and rotational movement is drivingly connected to the metering valve such that rotation thereof positions the metering valve, and the positioning of the metering valve rotates the piston member. A lever member, which normally supplies the electronic computer with a parameter indicative of a requested engine speed, is adapted to coact with the piston member to produce rotation thereof. More specifically, a cam surface on one of the members and a follower on the other of the members are arranged in such a manner that longitudinal movement of the piston member which is sufficient to cause the follower on the cam surface to engage may rotate the piston member in one direction, and the opposite direction, or produce no rotation. During this action, the sense of piston member rotation is dependent upon the relative position of the lever member to the piston member. In this latter regard, should the relative position of the lever be such that the metering valve position exactly corresponds to the lever position, no rotation of the piston will be produced by the engagement of the cam surface and the follower. A piston member positioning structure, which is responsive to a selection signal, is employed for longitudinally moving the piston member at a predetermined slewing velocity whereby when the follower and cam surface engage, metering valve position, and hence fuel flow, will be a suitable function of time until the transfer of control is completed so as to approximate an acceleration or deceleration schedule. The piston member positioning structure is controlled by manual control selector which is operatively connected to the computer so as to be responsive to the functioning thereof.

Hence, when the manual control selector of the invention senses a computer failure and generates the proper selection signal to the piston member positioning structure, fuel flow is automatically gradually changed, if necessary, until metering valve position corresponds to lever member position, at which time movement of the lever member produces a corresponding movement of the metering valve. It will, therefore, be appreciated that a computer to manual changeover system according to the invention does not occasion sudden changes in fuel flow which could be detrimental to safe engine operation. The invention is also believed to be unique and advantageous in that the transfer of control from the electronic computer to an operator may be accomplished without any action on the part of the operator. In addition, a system according to the invention is advantageous in that the transfer of control may also be easily effected at the option of the operator, thereby enhancing the versatility of the system.

Accordingly, it is a primary object of the invention to provide a computer to manual changeover system for an electromechanical fuel control.

Another object is to provide a computer-manual changeover system for an electromechanical fuel control which provides for fuel flow scheduling until the changeover process is completed.

These and other objects and advantages of the invention will become more readily apparent from the following detailed description, taken in conjunction with the accompanying drawings, in which:

DETAILED DESCRIPTION OF PREFERRED EMBODIMENT

Figure 1:
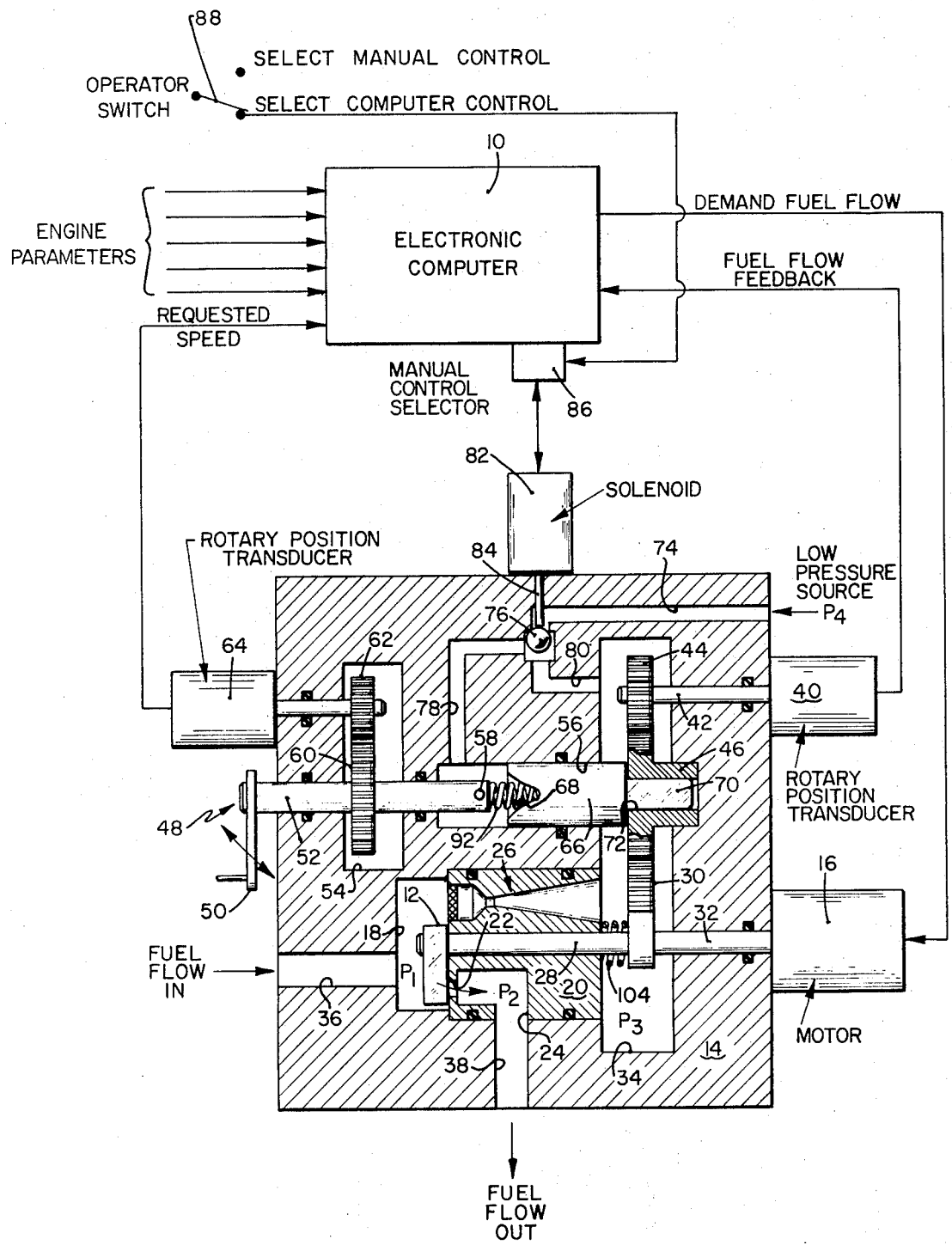
FIG. 1 is a schematic diagram of a computer to manual changeover system according to the invention.

Referring to FIG. 1 of the drawings, there is shown a simplified representation of a fuel control embodying a computer to manual changeover system according to the invention. With respect to FIG. 1, it will be understood that those elements of the fuel control which are not essential to an understanding of the present invention are not depicted therein.

The fuel control includes an electronic computer 10 which senses various operating parameters of a gas turbine engine (not shown) such as temperature, compressor discharge pressure, and engine speed. A metering valve 12 is mounted in a plural cavity housing 14 for controlling fuel flow to the engine. A motor 16 is operatively connected to the metering valve 12 for positioning the metering valve in accordance with a control signal applied thereto by computer 10, the control signal being indicative of demanded fuel flow as calculated by the computer. Metering valve 12 is contained within a cavity 18 of housing 14, together with a fuel metering cartridge 20 which has a metering orifice 22 in communication with an outlet 24. The fuel metering cartridge 20 also includes a cavitating venturi 26, the function of which is explained hereinafter. The position of metering valve 12, which determines the effective area of metering orifice 22, is controlled by a shaft 28 extending through the metering cartridge 20 and having its end connected to a sector gear 30. The sector gear 30 is in turn drivingly connected to the motor 16 by a shaft 32. The motor 16 may be a stepping motor. Operation of the motor 16 by the control signal from computer 10 serves to rotate sector gear 30, shaft 28 and metering valve 12 in unison. It will be noted that the sector gear 30 and also the adjacent ends of shafts 28 and 32 is contained within an elongated cavity 34 in the housing 14. The motor 16, the shafts 28 and 32, and the sector gear 30 thus define a valve driving mechanism. Flow proceeds into cavity 18 from an inlet conduit 36 at a pressure $P_1$ and emerges from the outlet 24 of the fuel metering cartridge 20 into an outlet conduit 38 in housing 14, the pressure downstream of metering orifice 22 being designated $P_2$. In order that there be a correspondence between metering valve position and the rate of flow through orifice 22, the differential pressure across metering orifice 22 ($P_1$ minus $P_2$) is held constant by a metering head regulator (not shown).

The computer 10 receives a feedback signal indicative of valve position from a rotary position transducer 40. Position transducer 40 is driven by a shaft 42 having a gear 44 carried upon its end. An idler gear 46 is interposed between the gear 44 and sector gear 30 in meshing engagement therewith such that a rotation of gear 30 produces a corresponding rotation of gear 44. It will be noted that gear 44 and idler gear 46 are also mounted within the cavity 34 of housing 14. The requested engine speed is set by a lever member, generally shown at 48, which is partially mounted within the housing 14 for rotation. Lever member 48 comprises a handle 50 which is fixedly secured to a shaft 52. The shaft 52 extends through a cavity 54 into yet another cavity 56. The extremity of the shaft 52, which is located in the cavity 56, is provided with a cam follower 58 whose function is discussed hereinafter. Carried by an intermediate portion of shaft 52 is a gear 60 which is in meshing engagement with a gear 62 for furnishing an operator signal, representative of a desired engine speed, to rotary position transducer 64, the rotary position transducer 64, in turn, directing a requested speed signal to the electronic computer 10.

A piston member 66 is mounted within the cavity 56 for longitudinal and rotational movement therein. The piston member 66 has a cam surface 68 defined on the left end thereof. The right end of the piston member 66 has a shank 70 having a square cross-section, the shank 70 being received within a recess 72 of similar cross-section within the central portion of idler gear 46. The connection between the idler gear 46 and the shank 70 is such that rotation of the piston member 66 rotates the idler gear 46, whereas axial movement of the piston member 66 produces no rotation of the idler gear 46 since the square shank will merely slide in a longitudinal direction within the recess 72. In FIG. 1, the piston member 66 is depicted in its normal position wherein the fuel control is being operated by the electronic computer 10. In this mode of control, the piston member 66 in no way influences fuel flow, but merely rotates as the metering valve is rotated.

The structure which longitudinally moves the piston member 66 will now be described. A first conduit 74 communicates with a source of low pressure (at pressure $P_4$) for directing this low pressure to a ball-type selector valve 76. A second conduit 78 places the valve 76 in communication with the left portion of cavity 56, and hence the left side of piston member 66. The cavitating venturi 26, which functions as an orifice means, communicates high pressure fuel at pressure $P_1$ to the exposed surface of the piston member 66 adjacent shank 70. The pressure in cavity 34 is designated $P_3$, this pressure being the pressure to which the piston member 66 is subjected. A third conduit 80 interconnects the valve 76 and cavity 34 to communicate pressure $P_3$ to the left side of the piston when the valve 76 is in the closed position, as illustrated in FIG. 1. Obviously, when the valve 76 is in the closed position, illustrated in FIG. 1, the pressure $P_3$ is equal to the pressure $P_1$, and hence both sides of the piston member 66 are referenced to equal pressures. Valve 76 may be moved from the closed position of FIG. 1 to an open position, downwardly displaced therefrom, by applying a selection signal to solenoid 82 which deenergizes the solenoid so as to drive a depending plunger 84 downwardly which causes the valve 76 to seat and thereby fluidly interconnect conduits 78 and 74. As illustrated in FIG. 1, SELECTOR valve 76 and plunger 84 are not connected. It will be appreciated that the differential pressure $P_3 - P_4$ maintains the valve 76 in the closed position and continuously urges the valve 76 upwardly after the plunger 84 drives valve 76 to the open position.

When the valve is in the open position, the left side of the piston member 66 is referenced to the pressure $P_4$, this pressure being the pressure of the low pressure source, and the right side of the piston member remains referenced to the pressure $P_3$. Hence, this action imposes a motive pressure differential across the piston member 66 which causes the piston member 66 to undergo a longitudinal slewing movement towards the shaft 52 of lever member 48. During the longitudinal movement of piston member 66 toward lever 48, the pressure $P_3$ will not remain constant, but will vary in such a manner that the slewing velocity of piston member 66 will remain constant. It should be noted that the utilization of the cavitating venturi to control the velocity of a piston or similar device is a conventional technique and discussed in detail in "Hydraulic and Pneumatic Power and Control" by F. D. Yeaple.

When the valve 76 is moved to the open position by the deenergization of solenoid 84, piston member 66 will begin moving to the left. The leftward slewing velocity of piston member 66 will remain constant if the pressure $P_1$ is maintained at a constant value. This is because the pressure drop across the orifice of the cavitating venturi 26 is inherently maintained at a constant value, viz.: the difference between the pressure $P_1$ and the vapor pressure of the fuel. Hence, the flow into cavity 34 is constant irrespective of the changes in the pressure $P_3$. It should be noted that the flow will remain constant into the cavity 34 as long as cavitation occurs in the throat of venturi 26. It will be appreciated that by providing for a constant velocity of piston member 66 during the changeover process from computer control to manual control, the shaping of the cam surfaces which furnish the acceleration and deceleration schedules is greatly facilitated.

To energize and deenergize the solenoid 82, a manual control selector 86 is operatively connected to the computer 10 and the solenoid 82 for applying a selection signal to the solenoid which effects the deenergization thereof and any subsequent energization thereof.

The manual control selector 86 is also connected to a manually operable toggle switch 88 so that an operator may select either automatic computer control or manual control. The manual control selector 86 may be connected to a threshold logic circuit which senses a computer malfunction, or may simply sense when power is not being applied to the computer. In either event, the signal from the selector 86 functions to deenergize the solenoid 82 thereby driving the plunger 84 downwardly which moves the valve 76 to the open position.

Figure 2:
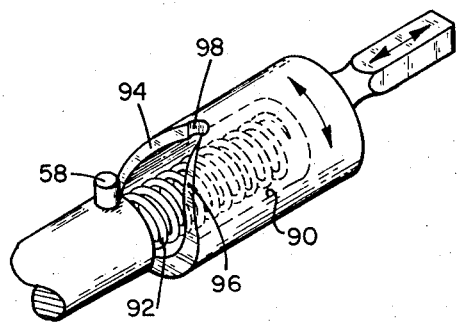
FIG. 2 is a perspective view of the piston member of FIG. 1 and the end of the lever member upon which the follower is mounted.

The detailed construction of the piston member 66 and its relationship to the lever member 48 is depicted in FIG. 2. Preferably, the piston member 66 has a cavity 90 which contains a compression spring 92 which abuts the right vertical face of the shaft 52. The piston member 66 is thereby biased toward the right, or toward idler gear 46. The wall of the piston member 66, adjacent the left portion of cavity 90, is so profiled that the cam surface 68 resembles a V when viewed from above. Cam surface 68 comprises a first surface 94, which represents an acceleration schedule, and a second surface 96, which represents a deceleration schedule, and thus would normally not be a mirror image of first surface 94. Adjacent the apex defined by the surfaces 94 and 96 a semicylindrical recess 98 is provided in the wall of the piston member 66 for receiving follower 58. When the follower 58 is received within the recess 98, manual control has been achieved and rotation of the shaft 52, as beget by the positioning of handle 50, produces a corresponding angular rotation of the piston member 66.

Figure 3:
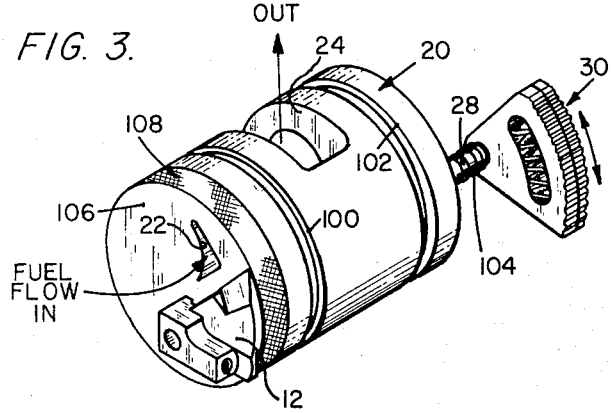
FIG. 3 is a perspective view of a preferred form of the fuel metering cartridge depicted in FIG. 1.
Figure 4:
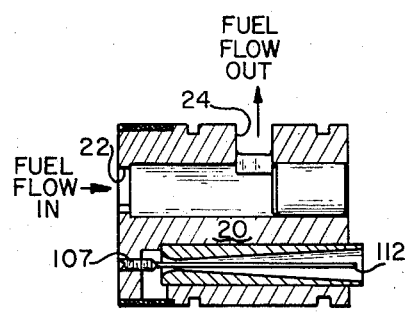
FIG. 4 is a longitudinal cross-section of the fuel metering cartridge of FIG. 3.

FIGS. 3 and 4 depict the fuel metering cartridge 20, schematically shown in FIG. 1, in perspective and in section, respectively. As illustrated, the fuel metering cartridge is cylindrically shaped and provided with a pair of circumferential O-rings 100 and 102. It can be seen from FIG. 3 that sector gear 30 is a conventional antibacklash type gear, and that a compression spring 104 surrounds the shaft 28 to urge the sector gear 30 away from the fuel metering cartridge 20 so that valve 12 will abut the front face 106 of the fuel metering cartridge 20 in a fluid sealing manner. With reference to FIGS. 3 and 4, a screen 108 is mounted on the cartridge 20 to filter fuel entering the cavitating venturi 26. A set screw 107, in threaded engagement with the cartridge 20, has an elongated tapering stem 112 which projects into the throat of the venturi to control the size of the restriction to flow presented thereby, and hence the slewing velocity of the piston member 66.

OPERATION

Assuming, for example, that delivery of power to electronic computer 10 is interrupted, a consequential selection signal from manual control selector 86 is directed to the solenoid 82, thereby deenergizing the solenoid. This results in the extension of the plunger 84 which moves the selector valve 76 from the closed position to the open position. The left side of the piston member 66 is now in communication with the pressure $P_4$ via the first conduit 74 and the second conduit 78, while the right side of piston member 66 is exposed to the higher pressure $P_3$. The piston member 66 now begins to longitudinally move towards the shaft 52 of the lever member 48. The rate of flow from cavity 18 into cavity 34 (which is at pressure $P_3$) is a constant due to the cavitating venturi 26 which is traversed by the incoming flow. Movement of the piston member 66 towards the lever member 48 causes the shank 70 to slide within the mating recess 72 in idler gear 46. No torque is applied to the idler gear 46 by the piston member 66 until the cam surface 68 engages follower 58 on shaft 52. Hence, the initial sliding of the piston member 66 has no effect upon the position of metering valve 12. Assuming now that just prior to power loss to the electronic computer 10, the lever 48 was positioned so as to command a lesser speed and that the electronic computer 10 had not completed the commanded deceleration, the follower 58 engages the second surface 96 when the piston member 66 has undergone sufficient leftward longitudinal travel. After this engagement occurs, piston member 66 undergoes a clockwise rotation as its longitudinal movement in the direction of lever 48 continues. This clockwise rotation of piston member 66, simultaneous with its longitudinal movement, causes idler gear 46 to also rotate in a clockwise direction which produces a counterclockwise rotation of gear 30, shaft 28, and metering valve 12. Fuel flow will thereby continue to be reduced by the rotation of piston member 66 until the follower 58 is received within the notch 98. When the follower 58 is received in the notch 98, any movement of the lever 48 produces a corresponding movement in metering valve 12. Should the electronic computer 10 lose power during engine acceleration, the sequence of events remains the same except that follower 58 contacts surface 94, thereby causing the piston member 66 to rotate in a counterclockwise sense which, in turn, will produce a clockwise rotation of shaft 28 and metering valve 12. Obviously, a clockwise rotation of metering valve 12 serves to increase fuel flow.

After the manual control selector 86 senses proper functioning of the computer 10 or a repositioning of toggle switch 88, a selection signal is generated thereby which energizes solenoid 82. Plunger 84 is then withdrawn, thereby permitting valve 76 to be moved upwardly by the pressure forces. The piston member 66 is then driven to the right, back to its initial position, by virtue of the force differential imposed thereupon by the high pressure in the left portion of cavity 56 and the urging of spring 92.

Figure 5:
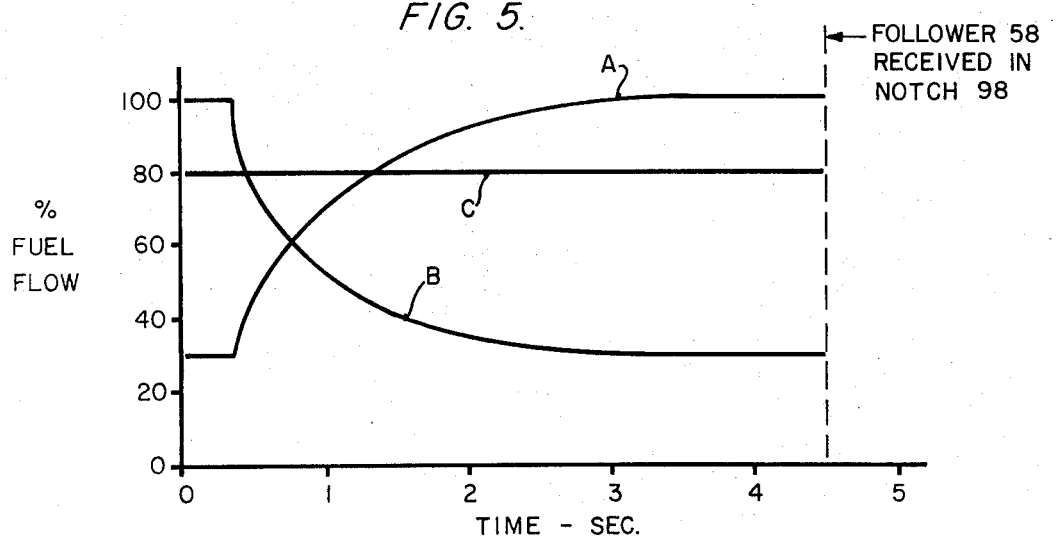
FIG. 5 depicts typical fuel flow transient characteristics of a system, such as that shown in FIG. 1.

With reference to FIG. 5, a typical relationship between fuel flow and time is illustrated. In FIG. 5, curve A illustrates the acceleration characteristics produced by the cam surface 94, and curve B illustrates the deceleration characteristics produced by cam surface 96. It will be appreciated that the curves of FIG. 5 represent typical transient characteristics after engagement between the follower 58 and the cam surface 68. For the case where the fuel flow commanded by the computer at failure corresponds exactly to the position of lever 48, the follower 58 will directly enter the notch 98 without contacting either of the cam surfaces 94 or 96. Such a case is illustrated by line C in FIG. 5. It is important to note that the position of lever 48 reflects a requested percentage engine speed when the fuel control is being operated by the electronic computer 10. However, when the manual system is in operation, the position of the lever 48 reflects a commanded fuel flow. Hence, the acceleration and deceleration schedules fashioned on the cam surface 68 are for a preselected altitude and temperature condition. Thus, the location on the cam surface 68 at which the follower 58 makes contact for a given lever position and engine speed will vary with altitude and temperature and other factors such as engine parameter limitations.

It will be appreciated that the invention may be practiced otherwise than is specifically described. For example, the cam surface 68 may be provided on the lever 48 and the follower placed upon the piston member 66. In addition, the piston member 66 need not be positioned by fuel pressure, but may be positioned by a motor such as an electric or hydraulic motor. This will allow for the elimination of the depicted piston positioning structure, to wit.: solenoid 82, valve 76, conduits 74, 78 and 80, and cavitating venturi 26. With regard to the cavitating venturi 26, while it is preferable to have the piston move longitudinally at a constant velocity, it is not essential to the invention since a conventional orifice would suffice. In addition, it will be appreciated that the maintenance of a constant head across the metering valve is also not essential to the invention. Accordingly, we wish to limit our invention only by the scope of the following claims:

We claim:

1. In a fuel control for an engine, the combination comprising:
   a metering valve for controlling fuel flow to the engine;
   a valve driving mechanism operatively connected to the metering valve for positioning the metering valve in accordance with a control signal applied thereto;
   an electronic computer, responsive to a plurality of engine parameters, operatively connected to the valve driving mechanism for applying the control signal thereto;
   a lever member for setting a requested speed;
   a transducer operatively connected to the lever member for directing a requested speed signal to the computer;
   a piston member, adapted for longitudinal and rotational movement, drivingly connected to the metering valve such that rotation thereof positions the metering valve and a positioning of the metering valve rotates the piston member;
   a cam surface on one of said lever and piston members and a follower on the other of the members arranged such that longitudinal movement of the piston member causes the follower and cam surface to engage, the cam surface being shaped such that engagement of the follower therewith may, depending upon the relative positions of the lever member and the piston member, rotate the piston member in one direction, rotate the piston member in the opposite direction, or produce no rotation of the piston member;
   a manual control selector operatively connected to the computer for generating a selection signal; and a piston member positioning structure responsive to the selection signal for longitudinally moving the piston member.

2. The combination of claim 1, wherein the piston member positioning structure comprises:
   a selector valve adapted to assume closed and open positions;
   a first conduit for placing the selector valve in communication with a source of low pressure;
   a second conduit for placing the selector valve in communication with a side of the piston member such that when the selector valve is open the side of the piston member communicates with the source of low pressure;
   an orifice means for placing the other side of the piston member in communication with a source of high pressure, the pressure to which the second mentioned side of the piston member is exposed being confined when the selector valve is open;
   a third conduit for placing the selector valve in communication with the second mentioned side of the piston member such that when the selector valve is closed the pressure on the second mentioned side of the piston member is communicated to the first mentioned side of the piston member via the second conduit.

3. The combination of claim 2, further including:
   a cartridge having a metering orifice and an outlet communicating therewith, the metering valve adapted to cover the metering orifice; and wherein the orifice means comprises:
   a cavitating venturi located in the cartridge to produce a constant piston member velocity when the selector valve is opened.

4. The combination of claim 3, wrhein the valve driving mechanism comprises:
   a shaft connected to the metering valve, the shaft extending through the cartridge;
   a motor operatively connected to the computer for receiving the control signal therefrom;
   means to interconnect the motor and the shaft.

5. The combination of claim 1, wherein the valve driving mechanism comprises:
   a shaft connected to the metering valve;
   a motor adapted to receive the control signal; and
   means to drivingly interconnect the motor and the shaft.

6. In an improved engine fuel control of the type having:
   a metering valve for controlling fuel flow to the engine;
   a valve driving mechanism operatively connected to the metering valve for positioning the metering valve in accordance with a control signal applied thereto;
   an electronic computer, responsive to a plurality of engine parameters, operatively connected to the valve driving mechanism for applying the control signal thereto;
   a lever member for setting a requested speed; and
   a transducer operatively connected to the lever member for directing a requested speed signal to the computer; wherein the improvement comprises:
   means to automatically transfer the control of the valve driving mechanism from the computer to the lever member upon a failure of the computer; and means to position the metering valve as a function of time during the transfer of control such that sudden increases or decreases in the fuel flow are avoided for a given lever member position.

* * * * *